(12) United States Patent
Hsieh

(10) Patent No.: US 6,879,987 B2
(45) Date of Patent: Apr. 12, 2005

(54) METHOD FOR STORING RECORDS IN DATABASE OR READING THE SAME THEREFROM

(75) Inventor: Ming-Hsiao Hsieh, Taipei (TW)

(73) Assignee: Inventec Corp., Taipei (TW)

( * ) Notice: Subject to any disclaimer, the term of this patent is extended or adjusted under 35 U.S.C. 154(b) by 499 days.

(21) Appl. No.: 09/984,752

(22) Filed: Oct. 31, 2001

(65) Prior Publication Data

US 2003/0084028 A1 May 1, 2003

(51) Int. Cl.[7] .............................................. G06F 17/00
(52) U.S. Cl. ................................................ 707/104.1
(58) Field of Search ........................... 707/104.1, 102, 707/100, 3, 1, 201; 717/126, 1

(56) References Cited

U.S. PATENT DOCUMENTS 5,563,997 A * 10/1996 Fisher ......................... 345/809
6,128,610 A * 10/2000 Srinivasan et al. ............ 707/3
6,681,383 B1 * 1/2004 Pastor et al. ................ 717/126

OTHER PUBLICATIONS

Strin gstorage and searching for database application George P. Copeland, Aug. 1978, vol. 10, 13, 7.*
Iteractive Editing System Meyrowitz Andries Van Dam, Sep. 1982, vol. 14.*

* cited by examiner

Primary Examiner—Safet Metjahic
Assistant Examiner—Sana Al-Hashemi
(74) Attorney, Agent, or Firm—Bacon & Thomas, PLLC

(57) ABSTRACT

A method for storing records in a database or reading the same therefrom includes the steps of editing data of a non-indexed field of a conventional database as a string of comment characters through a conversion table so as to store the same in a remark field of the database; and showing contents of data of the non-indexed field on a screen of the database by referring to the conversion table in reading the string of comment characters contained in the remark field of the database.

5 Claims, 6 Drawing Sheets

| name | attribute | length | condition | |
|---|---|---|---|---|
| order number | char | 12 | not null | ⎫ |
| code | char | 10 | not null | ⎬ indexed field ⎭ |
| part 1 | char | 16 | ⋮ | |
| ⋮ | ⋮ | ⋮ | ⋮ | |

FIG. 1 (Prior Art)

| order number | code | part 1 | ...... |
|---|---|---|---|
| | | | |
| | | | |
| | | | |
| ⋮ | ⋮ | ⋮ | ⋮ | indexed field

FIG. 2 (Prior Art)

| name | attribute | length | condition |
|---|---|---|---|
| Pnc | char | 12 | not null |
| TP | char | 13 | not null |
| Descr | char | 15 | ⋮ |
| Remark | ⋮ | 200 | ⋮ | indexed field { Pnc, TP, Descr }

FIG. 3

| Pnc | TP | Descr | Remark |
|---|---|---|---|
|  |  |  |  |
|  |  |  |  |
|  |  |  |  |
| ⋮ | ⋮ | ⋮ | ⋮ | indexed field

FIG. 4

| code | name of non-indexed data |
|---|---|
| PN | CPQ Part no |
| CFG | Customer Config code |
| SM | Special Motel |
| ⋮ | ⋮ |
| ⋮ | ⋮ |
| ⋮ | ⋮ |
| ⋮ | ⋮ |
| ⋮ | ⋮ |
| ⋮ | ⋮ |

FIG. 5

METHOD FOR STORING RECORDS IN DATABASE OR READING THE SAME THEREFROM

FIELD OF THE INVENTION

The present invention relates to a database and more particularly to a method for storing records in a database or reading the same therefrom.

BACKGROUND OF THE INVENTION

Conventionally, a database system comprises a plurality of databases and a database program. Typically, prior to establishing a database system, it is required to classify data of a record to be stored as a variety of fields based on properties thereof. For example, a typical order from a manufacturer comprises fields of serial number, type, part number, unit price, etc. Such order is stored as a record in a database having fields for respectively storing the serial number, type, part number, unit price, etc. Thus, in customizing the database, it is required to define a unique attribute (such as alphabet, number, date, etc.) based on contents of data to be stored in the field as well as the length of a respective field, and input and output conditions. Subsequently to the completion of defining fields of the respective database, a database program is then able to perform input, output, or conversion on contents of data in each field of the database.

In the above conventional database system, it is also required to define properties of fields in each record of the database based on the contents of data to be stored, as best illustrated in FIG. 1. The properties usually comprise name, attribute, length, and condition. Name iserves to indicate a title (e.g., order number) of data stored in the field. Attribute serves to indicate an attribute (e.g., alphabet, number, date, etc.) of data stored in the field. Length serves to indicate a maximum bit number of input data stored in the field. Condition serves to indicate an allowable condition of input data (such as an integer smaller than 50,000 and larger than 60,000). After completing the definition of all fields, as shown in FIG. 2, it is possible to design input and output screens of each database based on each field as customized in each database. Hence, by running the database program, a user may sequentially input contents of data to be stored into each field of the corresponding database through an input screen of the database, or alternatively read and show contents of data stored in each field of the corresponding database through an output screen of the database.

In general, the database system serves to store a great number of classified records. Thus, in searching a specific record from above records or creating a relationship among various databases, it is required to select at least one field as an indexed field from each record of each database. Hence, the specific record in the database system can be searched based on the indexed field prior to showing contents of the data of that record on a screen of the database. Alternatively, it will also be possible to perform a relational search among various databases. Such an indexed field is meant to indicate a data field in a database having a tendency of creating a relationship with one of a plurality of other databases. Therefore, an indexed field possesses a unique property to prevent an incorrect search of a record related to the indexed field from occurring in a query.

As stated above, in a typical database system it is required to define a length of each field in each database in advance. After the completion of a database system, a storage space in a memory is reserved for storing a record based on the maximum allowable length of data, irrespective of whether data has been inputted or input data has a length less than the maximum allowable length in each field of every record of each database. As a result, precious memory space may be wasted since there are many fields without data stored therein or a data length less than the maximum allowable length thereof. Such drawback is especially serious in a large database system. Thus, for a current database system, it is very important to effectively utilize storage space of memory thereof for storing input data.

In recent years, with the rapid development of the Internet and numerous Web sites installed thereon, a variety of services have become available by accessing the Internet. In a typical case, a multi-national enterprise may send (or inquire about) data through the Internet to provide updated information to branches, associated manufacturers, dealers, consumer, and so on worldwide. A service or inquiry about data is also made possible on the Internet through effectively integrating a plurality of large database systems, and providing the user with desired data in a minimum period of time. Besides, it is also important for an enterprise in expanding a network to effectively utilize storage space of a memory of a database system for storing data communicated on the Internet.

Thus, it is desirable to provide a method for storing records in a database or reading the same therefrom in order to overcome the above drawbacks, such as memory wasted due to many empty data fields in the database or data length less than the maximum allowable length thereof.

SUMMARY OF THE INVENTION

It is therefore an object of the present invention to provide a method for storing records in a database or reading the same therefrom comprising editing data of a non-indexed field of a conventional database as a string of comment characters through a conversion table so as to store the same in a remark field of the database of the invention; and showing contents of data of the nonindexed field on a screen of the database by referring to the conversion table in reading the string of comment characters contained in the remark field of the database.

In one aspect of the present invention, the conversion table comprises a name of the non-indexed field and a corresponding code in the conventional database so that the contents of data of the non-indexed field of the conventional database is capable of being edited as a string of comment characters containing the codes and the contents of the data by referring to the conversion table. The string of comment characters is also stored in a remark field of the record of the database of the invention. When the database of the invention reads the remark field, it can find a corresponding name of the field by referring to the conversion table. Moreover, the database of the invention can show the contents of data on the corresponding field of an output screen of the database based on the name of the field.

The above and other objects, features and advantages of the present invention will become apparent from the following detailed description taken with the accompanying drawings.

BRIEF DESCRIPTION OF THE DRAWINGS

FIG. 1 is a table showing fields of a record stored in a conventional database;

FIG. 2 is a view showing names of the table of FIG. 1 arranged in another table;

FIG. 3 is a table showing fields of a record stored in a database according to the invention;

FIG. 4 is a view showing names of the table of FIG. 3 arranged in another table;

FIG. 5 is a view showing a conversion table of the invention;

DETAILED DESCRIPTION OF THE PREFERRED EMBODIMENTS

The invention is directed to a method for storing records in a database or reading the same therefrom, in which a format of each field is defined with respect to a plurality of data to be stored in the database of a database system. Preferably, fields comprise a plurality of indexed fields and a remark field. Referring to FIGS. 3 to 6, an example of a database for recording parts supplied by a manufacturer is described. As shown, the indexed fields include Pnc (parts code), Descr (description), and TP (parts types) fields. In the database of parts, the record of each data only comprises a plurality of indexed fields and a remark field (FIG. 4). the remark field serves to store a string of character as a comment. In the invention, data of each record in a conventional database belonging to a non-indexed field (i.e., non-indexed data) is permitted to be input to a corresponding field of an input data table through an input screen of the database. Then data of each field of the data table is edited as a string of comment characters through a conversion table so as to store the same in a remark field of each record. Next, in reading the record, the database system of the invention can translate contents of data of the remark field by referring to the conversion table again. Finally, the same can be shown in a corresponding field of a data table of an output screen.

In the invention (see FIGS. 5 and 6), the conversion table comprises a name of non-indexed data to be stored (e.g., CPQ Part No.) and a corresponding code (e.g., PN) in each record. Hence, data of a corresponding field inputted to the input data table may be edited as a string of comment characters containing codes and contents of data by referring to the conversion table, and the string of comment characters may then be stored in the remark field of each record of the database.

As such, when the database system reads each record, it will be able to find a corresponding name of a field from the conversion table by referring to the codes contained in the string of comment characters in the remark field. Then the name of the field and corresponding data are shown on a corresponding field of a data table of an output screen of the database respectively.

Figure 6:
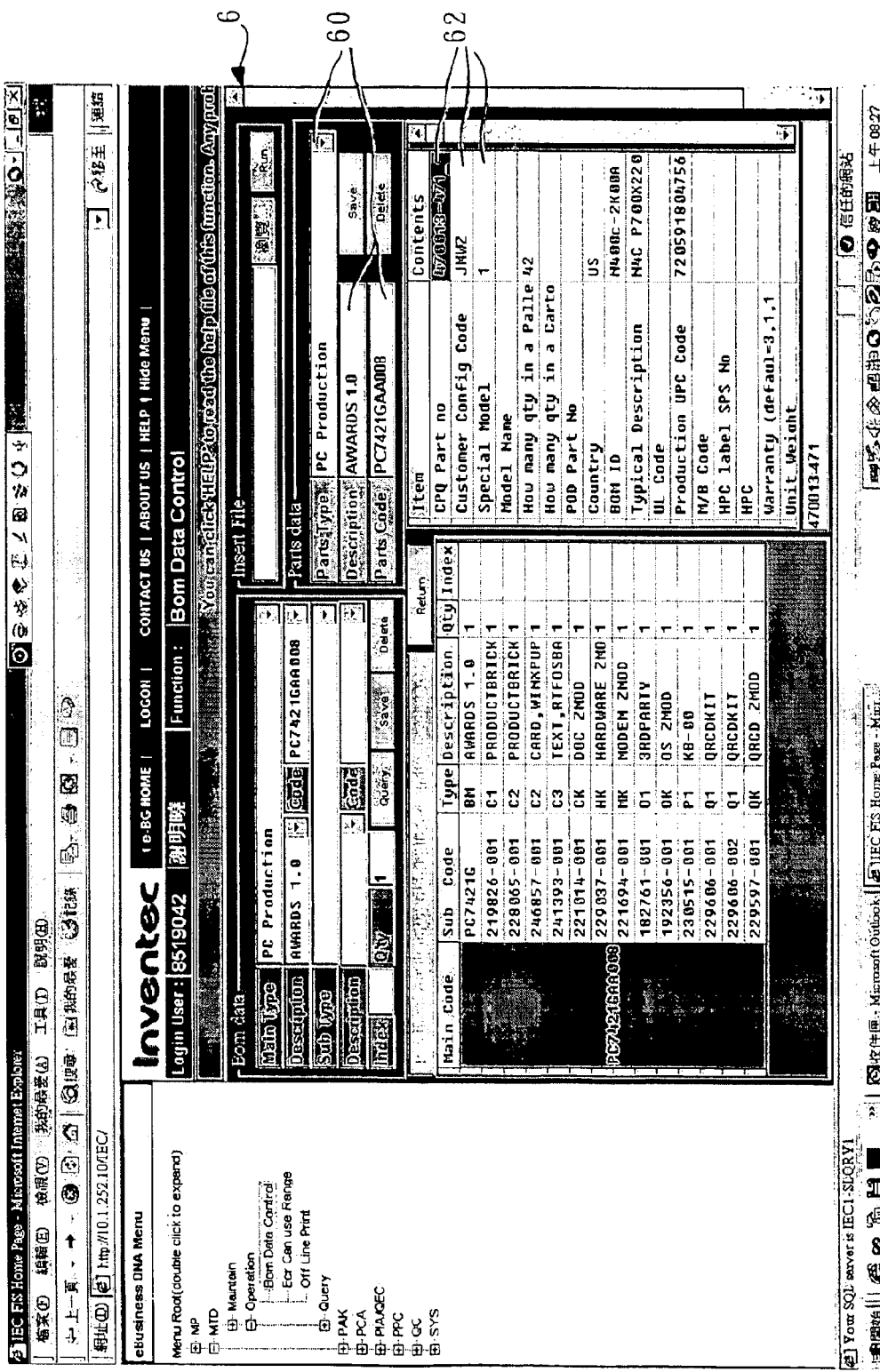
FIG. 6 illustrates a data table screen of a preferred embodiment of the invention.

Referring to FIG. 6, when the database system of the invention receives an input of non-indexed data from a user through a corresponding field of the data table of an input screen, it may translate a name of the corresponding field (e.g., CPQ Part No.) of the data table into a corresponding code (e.g., PN) through the conversion table. Next, an identification symbol (e.g., =) is added between the code and corresponding contents of each of the non-indexed data, and a demarcation symbol (e.g., ~) is added between adjacent data by referring to a specific editing definition. As a result, all input non-indexed data of the input screen are edited as a string of comment characters (e.g., PN=470013-471~CFG=JMWZ~ . . . ) and stored in a remark field of a record of the above database of the invention. Thereafter, when the database system of the invention reads the record, it is able to identify the identification symbol for correctly reading the code and corresponding contents of data, and identifying the demarcation symbol for correctly locating an end position of contents of the data and a beginning position of a next code and corresponding contents of data.

Referring to FIG. 6 again, there is illustrated a data table 6 of an input (or output) screen designed by a database program of the database system according to the invention. On the data table 6 there are provided a plurality of fields 60 and 62 for inputting (or outputting) indexed data and non-indexed data respectively. Thus, a user may sequentially input contents of data to be stored in corresponding fields 60 and 62 through data table 6. Alternatively, the user may read contents of data from the database and show the same on corresponding fields 60 and 62 of data table 6. Since the corresponding fields 62 of data table 6 reserved for nonindexed data input are designed based on names of fields of the conversion table, if there is a desire to increase or decrease number of corresponding field 62 of data table 6 for inputting additional non-indexed data, the invention only needs to modify the number of corresponding field 62 of data table 6, the name of the field, and the code of the conversion table. In contrast, a conventional database system must increase (or delete) a field of each database. As a result, the invention can prevent the database system from abnormally operating due to an incorrect increase or deletion of data fields of the database.

In the invention, the length of the remark field in database is obtained by estimating a total length of all non-indexed data in each record to be stored in the database. Thus, it is possible to increase or decrease storage of non-indexed data in each record by simply modifying the length of the remark field. Moreover, since the remark field serves to store all non-indexed data inputted in each record, unlike a conventional database system, the invention doesn't need to reserve a storage space in memory for storing a field of each non-indexed data. As a result, the capacity of database can be used more effectively.

Figure 7:
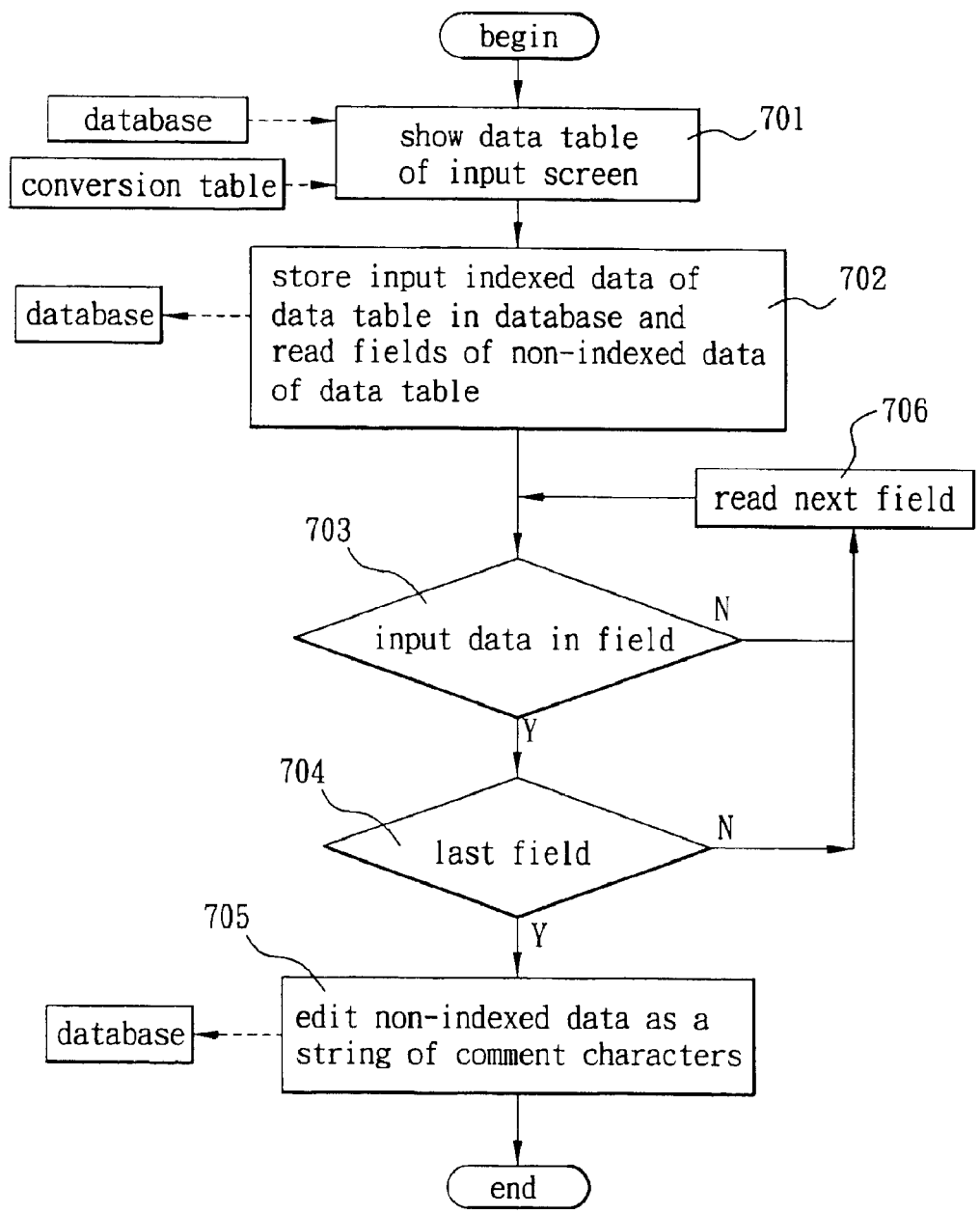
FIG. 7 is a flow chart illustrating how to store a record in a database of a database system according to the invention.

Referring to FIG. 7, there is shown a process of a preferred embodiment of the invention. A database program of database system performs the following steps for permitting a user to sequentially store input indexed data and nonindexed data in a record of the database through a data table on an input screen.

In step 701, a data table of an input screen is shown on a display. Fields of the data table for inputting indexed data are linked to indexed fields defined by the database while fields of the data table for inputting non-indexed data are linked to a conversion table.

In step 702, after indexed data and non-indexed data are sequentially inputted into a corresponding field through data table of input screen by user, the database system may directly store the input indexed data of the data table in an indexed field of a record in the database and sequentially read a corresponding field of the data table filled with input non-indexed data.

In step 703, a determination is made whether there is any input data in each corresponding field. If yes, the process goes to step 704. Otherwise, the process goes to step 706.

In step 704, a determination is made whether a field is the last corresponding field. If yes, the process goes to step 705. Otherwise, the process goes to step 706.

In step 705, a corresponding code is found from the conversion table based on the name of the field of the read non-indexed data. Then, non-indexed data is edited as a string of comment characters by referring to the code of the conversion table so as to store the same in the remark field of database.

In step 706, a next corresponding field is read. Then, the process loops back to step 703.

Figure 8:
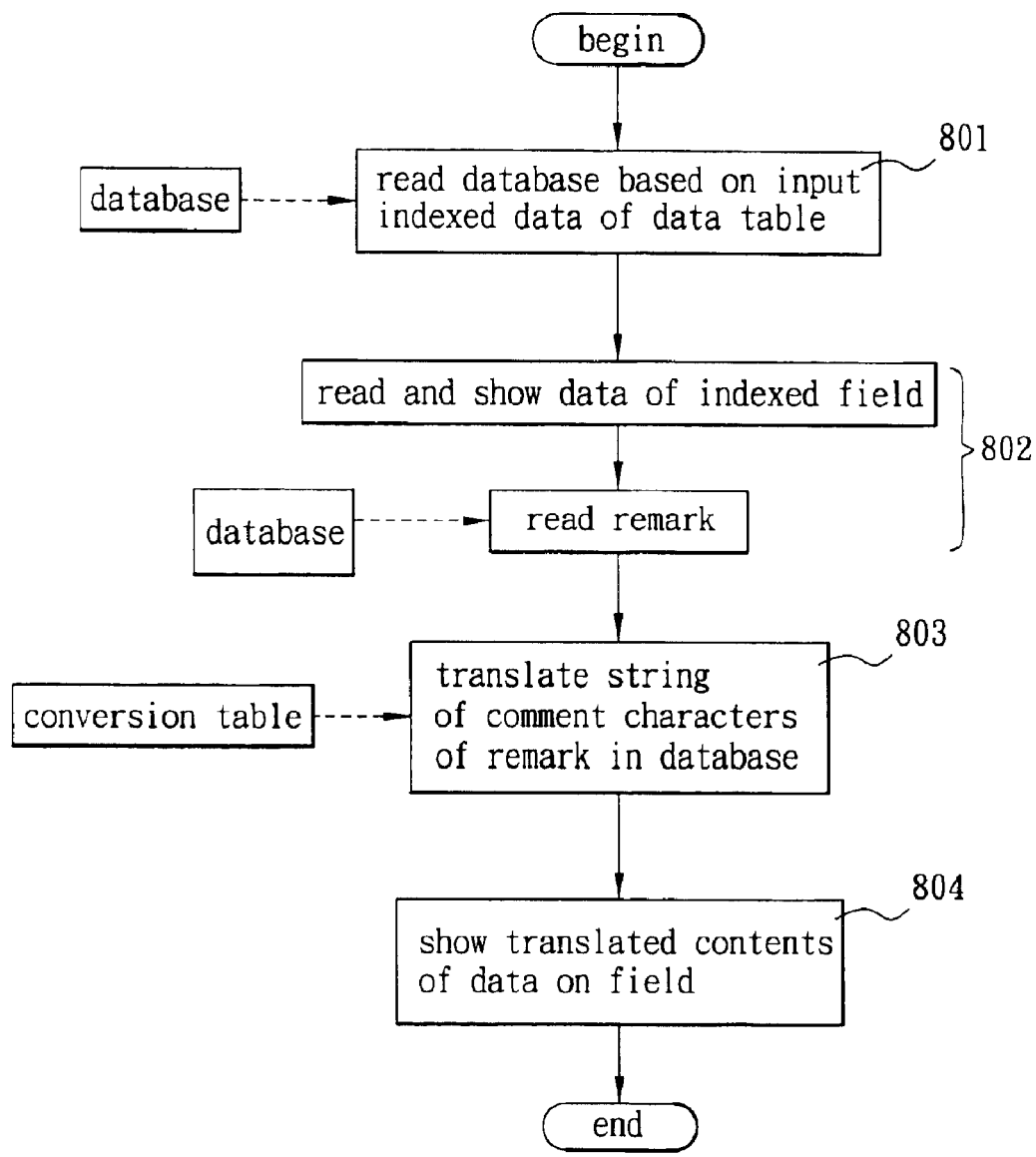
FIG. 8 is a flow chart illustrating how to search a record from the database of the database system according to the invention.

Referring to FIG. 8, there is shown a process according to the invention illustrating search by the program of the database system for a record from the database in accordance with indexed data inputted by a user in a data table on an output screen. The process comprises the following steps:

In step 801, after indexed data is inputted in corresponding fields through the data table of the output screen by the user, the database system may search a corresponding database based on input indexed data of the data table and read a record which is related to the input indexed data.

In step 802, data stored in each indexed field of the record is read and displayed in the data table of the output screen for showing corresponding fields of indexed data. Next, a string of comment characters stored in the remark field of the record is read.

In step 803, all non-indexed data contained in the string of comment characters is translated based on the code and name of the field defined by the conversion table.

In step 804, the translated non-indexed data is displayed in the data table of the output screen for showing corresponding fields of non-indexed data.

While the invention has been described by means of specific embodiments, numerous modifications and variations could be made thereto by those skilled in the art without departing from the scope and spirit of the invention set forth in the claims.

What is claimed is:

1. A method for storing records in a database or reading the same therefrom, the method comprising:

defining a plurality of fields of each record in each of a plurality of databases of a database system with respect to a plurality of data to be stored, wherein the fields include a plurality of indexed fields and a remark field;

inputting all non-indexed data to a corresponding field of a data table through a data table of an input screen of the database system;

editing input non-indexed data of each corresponding field of the data table as a string of comment characters through a conversion table so as to store the same in a remark field of each record;

translating contents of each data of the remark field by referring to the conversion table by the database system in reading the record; and displaying the same in one of fields of a data table of an output screen.

2. The method of claim 1, wherein the conversion table comprises a name of the non-indexed data to be stored and a corresponding code in each record so that data of the corresponding field inputted to the data table is capable of being edited as the string of comment characters containing the codes and the contents of data by referring to the conversion table.

3. The method of claim 1 or 2, further comprising the step of, when the database system receives the input non-indexed data through the corresponding field of the input data table, translating a name of the corresponding field of the data table into a corresponding code through the conversion table and adding an identification symbol between the code and the corresponding contents of data of each non-indexed data, and adding a demarcation symbol between adjacent data by referring to a predetermined editing definition, and editing all of the input non-indexed data of the input screen as the string of comment characters.

4. The method of claim 3, wherein the database system for sequentially storing input indexed data and non-indexed data in the corresponding record of the database through the data table performs the steps of:

showing the data table on a display, wherein the fields of the data table for the input indexed data are linked to the indexed fields defined by the database while the fields of the data table for inputting the non-indexed data are linked to the conversion table;

directly storing the input indexed data of the data table in the indexed fields of the record in the database and sequentially reading the corresponding field of the data table filled with the input non-indexed data;

first determining whether there is any input data in each corresponding field and, if the first determination is positive, performing a second determination step of determining whether the corresponding field is the last corresponding field; and if the second determination step is positive, performing the steps of finding the corresponding code from the conversion table based on the name of the field of the read non-indexed data, and editing the non-indexed data as the string of comment characters by referring to the code of the conversion table so as to store the same in the remark field of the database.

5. The method of claim 4, wherein the database system for searching a record from the corresponding database through the input indexed data of an output data table performs the steps of:

searching a corresponding database based on the indexed data in the data table for the input indexed data and reading a record which is related to the input indexed data;

reading data stored in each indexed field of the record, displaying the same on the data table of the output screen for showing the corresponding fields of the indexed data, and reading the string of comment characters stored in the remark field of the record;

translating all of the non-indexed data contained in the string of comment characters based on the code and the name of field defined by the conversion table; and showing the translated non-indexed data on the data table of the output screen for showing the corresponding fields of the non-indexed data.

* * * * *